UNITED STATES PATENT OFFICE.

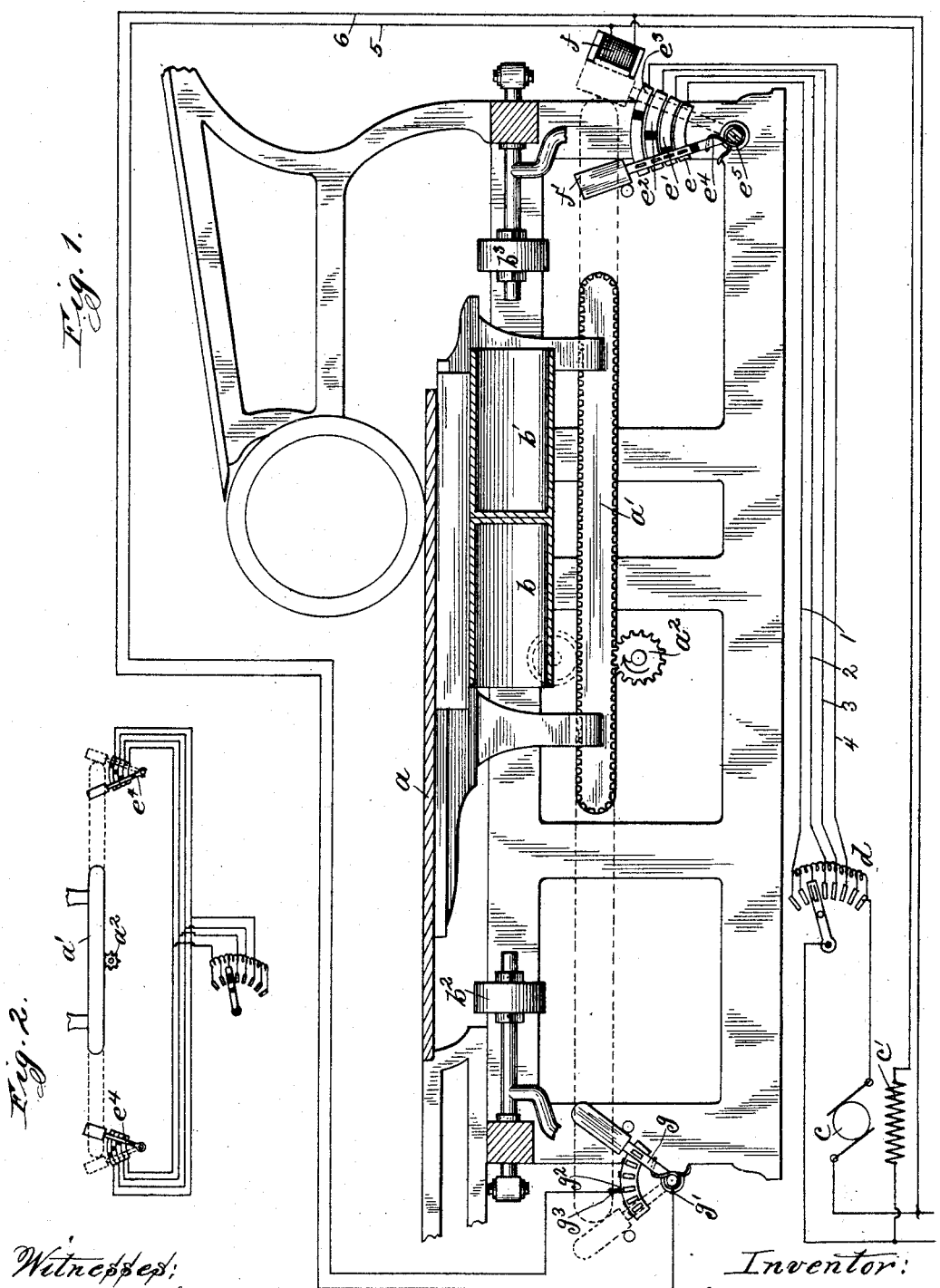

HENRY H. CUTLER, OF CHICAGO, ILLINOIS.

MOTOR-CONTROLLER FOR PRINTING-PRESSES.

SPECIFICATION forming part of Letters Patent No. 630,330, dated August 8, 1899.

Application filed August 22, 1898. Serial No. 689,172. (No model.)

*To all whom it may concern:*

Be it known that I, HENRY H. CUTLER, a citizen of the United States, residing at Chicago, in the county of Cook and State of Illinois, have invented a certain new and useful Improvement in Motor-Controllers for Printing-Presses, of which the following is a full, clear, concise, and exact description, reference being had to the accompanying drawings, forming a part of this specification.

My invention relates to a motor-controller for printing-presses, my invention relating more particularly to printing-presses having a reciprocating table driven by an electric motor, my object being, first, to provide means whereby the movement of the table upon the return stroke may be accelerated to thereby increase the output of the machine; and, second, to provide means whereby the torque of the motor may be automatically increased when the table reaches the ends of its travel, at which position increased force is required for moving the table.

In printing-presses having reciprocating tables the printing is effected on the advance stroke, no work being performed upon the return stroke, and in consequence the press is not performing useful work upon the return stroke. In printing-preses as commonly employed the table travels at the same speed upon the return stroke as upon the advance stroke, and since with fine work it is necessary to run the table at a comparatively slow speed considerable time is lost and the efficiency of the press is materially impaired by the long interval of time required for the return of the table to the initial position. It is the object of my invention to provide automatic means whereby the speed of the table may be accelerated upon the return stroke to any degree, and this without affecting the operation of the table or the speed thereof upon the advance or working stroke. The speed of the motor driving the printing-press is usually controlled by a rheostat, and in order to accomplish the acceleration of the table upon the return stroke I provide a switch adapted to be thrown into operation when the table reaches the end of its forward travel to short-circuit or otherwise remove from circuit a portion or all of the resistance of the rheostat, thereby admitting an increased current to the motor to increase the speed thereof and return the table to its initial position at an increased speed at which time the resistance of the rheostat is brought back to the normal by the operation of a controlling-magnet to permit the table to travel forward at the normal speed. When other means than a rheostat is provided for controlling the speed of the motor, the reciprocating table in a similar manner actuates the movable element of the controller as the table approaches the end of its travel.

Since the weight of the traveling table of a printing-press is considerable, it has been necessary to provide means for checking the table and overcoming the momentum thereof at the ends of the travel of the table, this usually being accomplished by the provision of plungers, whereby the table at the ends of its travel is caused to compress air to thereby check the motion of the table and bring the same gradually to rest. The provision of these checking devices increases the force or torque necessary for operating the printing-press when the table reaches the end of its travel, and due to this fact considerable difficulty has been experienced heretofore in driving the presses by means of electric motors, particularly when the press is doing fine work, where it is necessary to run the press at a low speed. When the motor is thus running at a low speed, a sudden increase of the resisting force to which the motor is subjected will oftentimes stop the motor, or at least render its operation unsteady and objectionable. To overcome this objection, I provide means whereby the resistance or a portion thereof may be automatically removed from the circuit of the rheostat controlling the motor as the table reaches the opposite end of its travel to thus increase the torque of the motor, the resistance being returned to the normal after the stoppage and reversal of the table has been accomplished.

In practice I have combined the two devices above considered, whereby the resistance of the rheostat is automatically decreased as the table reaches the end of its travel, the resistance being maintained in the decreased condition during the return stroke and also until the table has been again reversed and started upon its forward stroke.

I have illustrated my invention in the accompanying drawings, in which—

Figure 1 is a view of a printing-press embodying my invention, the circuits being shown in diagram. Fig. 2 is a view illustrating a modification of my invention.

Like letters refer to like parts in the several figures.

The reciprocating table $a$ carries a rack $a'$ having gear-teeth on the upper and lower edges and on the ends thereof, and a pinion $a^2$, driven by the motor through intermediate driving mechanism, engages the rack and imparts motion thereto. As the table reaches the forward end of its travel the pinion $a^2$ passes to the upper edge of the rack $a'$, as indicated in dotted lines, and thus while rotating in the same direction serves to impart motion to the table to return the same to its initial position. As illustrated, the table moves to the right in performing its advance or working stroke. Underneath the table a pair of cylinders $b$ $b'$ is provided, adapted to coact with the plungers $b^2$ $b^3$ as the table reaches the opposite ends of its stroke, the air compressed within the cylinders by the respective plungers serving to check the movement of the table and bring the same gradually to rest at the end of the stroke.

The mechanism as thus far described or equivalent structures are common to most printing-presses and form in their individual capacity no part of the present invention, one specific form of press being shown for the purpose of illustrating my invention.

The motor shown in the present instance as a shunt-motor is provided with an armature $c$ and with field-coils $c'$, connected in shunt therewith. In the armature-circuit is provided a rheostat $d$, and conductors 1 2 3 4 extend from the several coils of the rheostat to the contacts $e$ $e'$ $e^2$ $e^3$, respectively, over which a contact-arm $e^4$ is adapted to be moved, the arm being normally maintained to the left by means of the spring $e^5$. As the table moves to the right the rack $a'$ or other moving part of the table engages the end of the pivoted arm $e^4$ and moves the same to the right, first bridging together contacts $e$ $e'$ to short-circuit a portion of the coils of the rheostat $d$, then bridging together contacts $e$ $e'$ $e^2$ to short-circuit more of the coils of the rheostat, and finally at the end of its travel bridging together all of the contacts $e$ to $e^3$, to thereby short-circuit the prearranged number of coils of the rheostat. The current through the motor is thus increased as the table approaches the end of its travel. As the table begins its return stroke and the rack $a'$ moves out of engagement with the lever $e^4$ the spring $e^5$ returns the lever to its initial position and the resistance is gradually cut into the armature-circuit, the resistance, however, remaining in for a sufficient time to permit the table to be well started on its return stroke before the current through the motor is cut down by the increasing of the resistance of the rheostat. In order that the speed of the table may be accelerated upon the return stroke, I provide a retaining-magnet $f$, connected in circuit with the shunt-field $c'$ or otherwise connected, so that the magnet will be normally traversed by an exciting-current. When the lever $e^4$ has been moved to the right, the armature $f'$ upon the end thereof is brought in contact with the poles of magnet $f$, and the magnet thus serves to retain the arm in a position to short-circuit the coils of the rheostat. Increased current is thus supplied to the motor, and the table is run at increased speed. When the table reaches the opposite end of its return stroke, the rack $a'$ or other moving part of the table engages and moves lever $g$ against the tension of spring $g'$, to thereby move the lever past the contact $g^2$ to thus short-circuit the retaining-magnet $f$, the opposite sides of the said retaining-magnet being connected by conductors 5 and 6 with the contact $g^2$ and the lever $g$, respectively. The retaining-magnet $f$ being deënergized, the arm $e^4$ returns to its initial position and thus cuts in the resistance of the rheostat. The terminal $g^2$ may be adjusted in position, preferably, by the provision of a plug $g^3$, which may be moved into electrical contact with any one of a series of contact-terminals and the position of the table at which the magnet $f$ is deënergized thus adjusted at will. As the retaining-magnet $f$ is deënergized when the table is near the end of its stroke and an interval of time is required for the lever $e^4$ to perform its movement, the increased current continues to traverse the motor until the reversal of the movement of the table has been accomplished.

In Fig. 2 I have illustrated a modification wherein the current through the motor is automatically increased at each end of the travel of the table without accelerating the return stroke of the table. A switch-lever $a^4$, with its accompanying contacts, is provided at each end of the travel of the table, the contacts of the two switches being connected in parallel, whereby the resistance is gradually cut out of circuit as the table approaches the end of its travel and is then gradually cut in as the table starts upon its reversed stroke.

While I have described my invention with particular reference to printing-presses, I am aware that certain features of my invention are applicable to other machines, particularly where the machine has a reciprocating or moving part requiring increased power for its operation at certain points in the cycle of operation.

Having described my invention, what I claim as new, and desire to secure by Letters Patent, is—

1. The combination with a printing-press or other machine having a reciprocating table, of an electric motor for continuously driving said table back and forth without stopping, a motor-controller for increasing the driving capacity of the motor, and means operated as the table approaches the end of its travel for actuating said motor-controller to increase the driving capacity of the motor, substantially as described.

2. The combination with a printing-press or other machine having a reciprocating table, of an electric motor for operating the same, a motor-controller for varying the torque of the motor, and means operated as the table approaches the end of its travel for actuating the controller to increase the torque of the motor, substantially as described.

3. The combination with a printing-press or other machine having a reciprocating table, of an electric motor for operating the same, a motor-controller for increasing the speed of the motor and means for actuating said controller as the table approaches the end of its advance stroke to accelerate the speed of the table on the return stroke thereof, substantially as described.

4. The combination with a printing-press or other machine having a reciprocating table, of an electric motor operating the same, of a motor-controller and mechanism operated at each end of the travel of the table for actuating the controller to increase the torque of the motor, substantially as described.

5. The combination with a printing-press or other machine having a reciprocating table, of an electric motor for driving the same, a motor-controller for increasing the torque and the speed of the motor and mechanism operated as the table approaches the end of its advance stroke for increasing the torque of the motor at the ends of the travel of the table and increasing the speed of the motor during the return travel of the table, substantially as described.

6. The combination with a printing-press or other machine having a reciprocating table, of an electric motor for operating the same, a variable rheostat in the armature-circuit, and means operated as the table approaches the end of its travel for cutting resistance out of the armature-circuit, substantially as described.

7. The combination with a printing-press or other machine having a reciprocating table, of an electric motor for operating the same, a rheostat in the armature-circuit of the motor, and means for maintaining a decrease of resistance in the rheostat during each of the following periods; first, while the table is reversing at the forward end of the travel thereof, and, second, while the table is reversing at the rear end of the travel thereof, substantially as described.

8. The combination with a printing-press or other machine having a reciprocating table, of an electric motor for operating the same, a variable rheostat in the armature-circuit and automatic means for decreasing the resistance in the armature-circuit at the end of the advance stroke, during the return stroke and until the table is reversed and started again on the advance stroke, substantially as described.

9. The combination with a printing-press or other machine having a reciprocating table, of an electric motor for operating the same, a controller for varying the output of the motor, means for actuating the controller as the table approaches the end of its advance stroke a retaining-electromagnet for maintaining the controller in its changed position and means operated by the table near the end of its return stroke for deënergizing the retaining-electromagnet, substantially as described.

10. The combination with a printing-press or other machine having a reciprocating table, of an electric motor for operating the same, a motor-controller actuated as the table approaches one end of its travel, a retaining-electromagnet therefor, and a switch for short-circuiting the retaining-magnet as the table approaches the opposite end of its travel, substantially as described.

11. The combination with a machine having a moving part requiring increased power or torque for its operation at certain points in the cycle of operation, of an electric motor for operating the same, a controller therefor, and means automatically operated by a moving part of the machine for actuating the controller to increase the power or torque of the motor, substantially as described.

In witness whereof I have hereunto subscribed my name in the presence of two witnesses.

HENRY H. CUTLER.

Witnesses:
W. CLYDE JONES,
M. R. ROCHFORD.